United States Patent
Zhong et al.

(10) Patent No.: US 8,019,859 B2
(45) Date of Patent: Sep. 13, 2011

(54) REPORTING PROCESSING METHOD, ORIGIN SERVER AND USER CLIENT FOR USER AGENT PROFILE INFORMATION

(75) Inventors: Xueping Zhong, Shenzhen (CN); Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 12/240,423

(22) Filed: Sep. 29, 2008

(65) Prior Publication Data

US 2009/0024691 A1    Jan. 22, 2009

Related U.S. Application Data

(63) Continuation of application No. PCT/CN2007/000288, filed on Jan. 25, 2007.

(30) Foreign Application Priority Data

Mar. 31, 2006    (CN) .......................... 2006 1 0066884

(51) Int. Cl.
    *G06F 15/173*    (2006.01)
(52) U.S. Cl. .......................... 709/224; 709/203; 709/223
(58) Field of Classification Search .................. 709/203, 709/223, 217
    See application file for complete search history.

(56) References Cited

U.S. PATENT DOCUMENTS

| 7,275,243 B2* | 9/2007 | Gibbons et al. ....... 707/E17.116 |
| 2002/0138545 A1 | 9/2002 | Andreakis et al. |
| 2004/0196849 A1 | 10/2004 | Aksu et al. |
| 2006/0223503 A1* | 10/2006 | Muhonen et al. .......... 455/414.1 |
| 2008/0127190 A1 | 5/2008 | Shu et al. |
| 2008/0208950 A1 | 8/2008 | Kim et al. |

FOREIGN PATENT DOCUMENTS

| CN | 1568047 A | 1/2005 |
| CN | 1859177 A | 11/2006 |
| CN | 1859403 A | 11/2006 |
| WO | WO 2006/019276 A1 | 2/2006 |

OTHER PUBLICATIONS

"Device Management Requirements, Candidate Version 1.2—Jun. 7, 2005", Open Mobile Alliance Ltd., Jun. 2005.*

(Continued)

*Primary Examiner* — Philip B Tran

(74) *Attorney, Agent, or Firm* — Leydig, Voit & Mayer, Ltd.

(57) ABSTRACT

The present invention discloses a reporting processing method for User Agent Profile (UAP) information including: issuing, by an origin server, a reporting policy to a user client to instruct the user client to report UAP information according to the reporting policy; and reporting, by the user client, the UAP information according to the reporting policy issued by the origin server. The invention also discloses an origin server including a reporting policy issuing unit adapted to issue a reporting policy to a user client to instruct the user client to report UAP information according to the reporting policy; and a UAP user client including a UAP information reporting unit adapted to report UAP information of the user client according to a reporting policy issued by the origin server. The invention can enable the user client in a UAP system to report the UAP information with more flexibility and diversity.

14 Claims, 6 Drawing Sheets

OTHER PUBLICATIONS

Open Mobile Alliance, "Device Management Requirements." Candidate Version 1.2 (OMA-RD-DM-V1_2-20050607-C) (Jun. 7, 2005).

1st Office Action in corresponding Chinese Application No. 200610066884.6 (Aug. 25, 2010).

Written Opinion of the International Searching Authority in corresponding PCT Application No. PCT/CN2007/000288 (May 17, 2007).

"OMA Device Management Protocol," Jan. 25, 2005, Draft Version 1.2, Open Mobile Alliance Ltd., San Diego, California.

"OMA Device Management Representation Protocol," Jan. 2005, Draft Version 1.2, Open Mobile Alliance Ltd., San Diego, California.

"SyncML Data Sync Protocol," Jun. 1, 2004, Candidate Version 1.2, Open Mobile Alliance Ltd., San Diego, California.

"SyncML Device Information," Jun. 1, 2004, Candidate Version 1.2, Open Mobile Alliance Ltd., San Diego, California.

* cited by examiner

REPORTING PROCESSING METHOD, ORIGIN SERVER AND USER CLIENT FOR USER AGENT PROFILE INFORMATION

CROSS-REFERENCE TO RELATED APPLICATION

This application is a continuation of International Patent Application No. PCT/CN2007/000288, filed Jan. 25, 2007, which claims priority to Chinese Patent Application No. 200610066884.6, filed Mar. 31, 2006, both of which are hereby incorporated by reference in their entirety.

FIELD OF THE INVENTION

The present invention relates to User Agent Profile (UAP) technologies in the communication field, and in particular, to a reporting processing method for User Agent Profile information and a corresponding origin server and User Agent Profile user client.

BACKGROUND OF THE INVENTION

Various clients in a communication system exhibit different capabilities, and therefore it is necessary for an origin server to adapt the capability of a user client to a user demand based upon a certain processing way. For this purpose, it is necessary to enable capability information of a client to be exchanged between the origin server and the user client, and a User Agent Profile system provides a representation method for exchanging capability information of a client between the user client and the origin server, in which the capability information of the client is represented with UAP information, so that applications of a WAP service can be supported well.

Particularly, the capability information of a client includes, but is not limited to, the following information:

Hardware information, which refers to hardware features of the client, including information on a type, a model, a display screen size, supported input methods and output styles, and the like, of the client device;

Software information, which refers to a software operation environment of the client, including information on an operation system of the client device, whether video and audio encoding and decoding operations are supported, language options for a user, etc.;

A browser program, which refers to information on a set of features descriptive of an HTML browse application program;

Network features, which describe information on a network related structure and environment, such as a network bearer, etc.;

WAP features, which describe information related to the WAP supported by the client device, such as a WML browse capability and feature, etc.; and PUSH features, which describe information related to the PUSH supported by the client device, such as the maximum length of a short message that the client device can support, the maximum size of a short message that the client device can store.

In the UAP system, the capability information related to the user client can be provided to the origin server, so that the origin server can tailor the service contents to be issued to the user client in accordance with the capability information of the user client, thereby providing the service contents to the user client by using a format which is the most accordant to the capability of the user client.

With reference to FIG. 1, which shows a structural block diagram of main components of an existing UAP system, primarily including:

A UAP client: it typically refers to a UAP enabled intelligent client device, such as a mobile phone or a PDA. To initiate a network session connection to the network side, the UAP client puts its UAP related information (for example, a URL of a location where its capability information is stored) into a HTTP request message or a WSP request message and sends it to a WAP gateway or an origin server.

The origin server: it is a UAP enabled service application server, such as a PUSH server; the origin server can process the HTTP request message containing the UAP related information, which is sent from the UAP client, obtain UAP information corresponding to the UAP client from a UAPfile repository in accordance with the UAP related information (for example, the URL of the location where the capability information is stored) carried in the request message, and tailor service contents requested by the UAP client in accordance with the obtained UAP information and then issues the service contents to the UAP client.

The WAP gateway/a proxy cache: the WAP gateway, which is located between the UAP client and the origin server, is adapted for conversion between the WAP protocol and the HTTP protocol at the UAP client side, supports an operator on extending its own set of capabilities, and supports combining and then forwarding static information (i.e. the URL of the location where the capability information is stored) reported from the UAP client and dynamic information (such as capability information modified by the UAP client at the same time) to the origin server.

The UAPfile repository: it is adapted for storing UAP information of respective UAP clients, and allows the origin server or the WAP gateway to obtain UAP information corresponding to a UAP client in accordance with UAP URL information reported from the UAP client, where the UAP repository can be established or maintained by a client manufacturer or a network operator.

With reference to FIG. 2, a schematic diagram of a process in which the existing UAP client initiates a request to the origin server is shown, in which:

1. The UAP client initiates a webpage browse request to the origin server, and at this time, a session connection will be established between the UAP client and the origin server, the UAP client carries its UAP related information (which typically is the URL of the location where its UAP related information is stored) in the session connection request message, and the origin server obtains the corresponding UAP information from the UAPfile repository in accordance with the URL information carried in the session connection request message sent by the UAP client.

2. The origin server returns to the UAP client a response message, and if the origin server can process the UAP information properly, then the returned response message is OK; otherwise, an error code is returned.

With reference to FIG. 3, a schematic diagram of a process in which the existing UAP client reports on its own initiative the information on a capability change to the origin server when its capability information is changed is shown, where a session initiation phase exists only when the UAP client is connected to the origin server. During the session initiation phase, a session is maintained between the UAP client and the origin server and will not be disconnected until the connection between the UAP client and the origin server is closed; during the procedure, the origin server buffers UAP information of the UAP client; and during this procedure, the UAP client, once discovering that its UAP information is changed, notifies the WAP gateway or the origin server about the change of its UAP information in a Resume way, and this notification may occur for many times while the UAP client browses related contents:

1. The UAP client carries its changed UAP information in a XML form in a message header x-wap-profile-diff, and this message header is typically generated by the UAP client and is appended to a request message sent to the origin server to transport the information on the UAP change;

2. Upon receipt of the message header x-wap-profile-diff, the origin server feeds back a corresponding response message (including whether the origin server supports the use of UAP information, a reason for an error, etc.) based upon a message header w-wap-profile-warning.

Upon receipt of the changed UAP information of the UAP client, the origin server tailors the related service contents requested by the UAP client in accordance with the updated UAP information.

In the existing UAP system, however, the user client will trigger on its own initiative reporting of its UAP related information and/or its changed UAP information and the like to the origin server only if the user client initiates a browse request to the origin server or discovers, while browsing the service contents, that its UAP information is changed, but the origin server is supported on neither a capability of interrogating on its own initiative about the UAP information, nor a capability of information exchange with the user client, resulting in that the origin server cannot control reporting of the UAP information by the user client based upon a certain policy, accordingly, a specific implementation of the UAP system may be inflexible.

SUMMARY OF THE INVENTION

According to an embodiment of the invention, there is provided a reporting processing method for User Agent Profile information, to address the problem that a user client cannot report UAP information based upon a reporting policy indicated by an origin server in a UAP system, and the method includes: issuing, by an origin server, a reporting policy to a user client; and receiving User Agent Profile information reported by the user client every time upon discovery that the User Agent Profile information satisfies the reporting policy.

According to an embodiment of the invention, there is further provided an origin server including: a reporting policy issuing unit adapted to issue a reporting policy to a user client; and a User Agent Profile information receiving unit adapted to receive User Agent Profile information satisfying the reporting policy, which is reported by the user client every time upon discovery that the User Agent Profile information satisfies the reporting policy.

According to an embodiment of the invention, there is further provided a User Agent Profile user client including: a reporting policy receiving and parsing unit adapted to receive and parse a reporting policy issued by an origin server; and a User Agent Profile information reporting unit adapted to report User Agent Profile information satisfying the reporting policy received by the reporting policy receiving and parsing unit every time upon discovery that the User Agent Profile information satisfies the reporting policy.

According to an embodiment of the invention, there is further provided a reporting processing method for User Agent Profile information including: issuing, by an origin server to a user client, an interrogation request message for interrogating about User Agent Profile information, and receiving the User Agent Profile information that is interrogated about and reported by the user client in accordance with the interrogation request message.

According to an embodiment of the invention, there is further provided an origin server including: an interrogation request message generation unit adapted to generate an interrogation request message for interrogating about User Agent Profile information in a user client; an interrogation request message issuing unit adapted to issue the interrogation request message generated by the interrogation request message generation unit to the user client; and a User Agent Profile information receiving unit adapted to receive the User Agent Profile information that is interrogated about and reported by the user client in accordance with the interrogation request message.

According to an embodiment of the invention, there is further provided a User Agent Profile user client including: an interrogation request message receiving unit adapted to receive an interrogation request message issued from an origin server; a User Agent Profile information interrogation unit adapted to interrogate about User Agent Profile information in the user client in accordance with the interrogation request message received by the interrogation request message receiving unit; and a User Agent Profile information reporting unit adapted to report the User Agent Profile information that is obtained by the User Agent Profile information interrogation unit through interrogation.

In the solution according to the invention, the user client is enabled to report its related UAP information in accordance with the reporting policy issued and indicated by the origin server in the UAP system, thereby achieving the purpose of enabling the user client to report the corresponding UAP information based upon the reporting policy issued by the server, so that the user client is allowed to report the UAP information based upon a threshold, or report the UPA information periodically, etc., and thus the user client in the UAP system can report the UAP information in more flexibility and diversity.

In the other solution according to the invention, in the UAP system, the origin server issues to the user client the interrogation request message for interrogating about the UAP information, and the user client reports the corresponding UAP information to the origin server in accordance with the interrogation request message issued by the origin server, thus enabling the function of the origin server in the UAP system to interrogate on its own initiative the related UAP information of the user client, and therefore the user client in the UAP system is enabled to report the UAP information in more flexibility and diversity.

DETAILED DESCRIPTION OF THE INVENTION

In the solutions of the invention, the existing UAP functions are extended, so that a user client can report UPA information based upon a UAP reporting policy indicated by an origin server and the origin server is capable of interrogating on its own initiative about the UPA information of the user client as required, and thus the user client in a UAP system is capable of reporting the UPA information periodically, reporting the UAP information based upon a threshold and reporting the UAP information upon an interrogation request from the origin server, and the user client in the UAP system can report the UAP information in a more flexible and diverse way.

The UAP system of an embodiment the invention includes an origin server, a UAP server, and a UAP client. The UAP server is logically located between the origin server and the UAP client and is adapted for authenticating and forwarding information exchanged between the origin server and the UAP client, and buffering UAP information reported from the client device to the origin server. In a network system, the UAP server can either be integrated internal to the origin server or be disposed separately from the origin server.

The implementation principle, embodiments and achievable corresponding advantageous effects of the solutions of the invention will be set forth in detail hereinafter with reference to the drawings.

Figure 1:
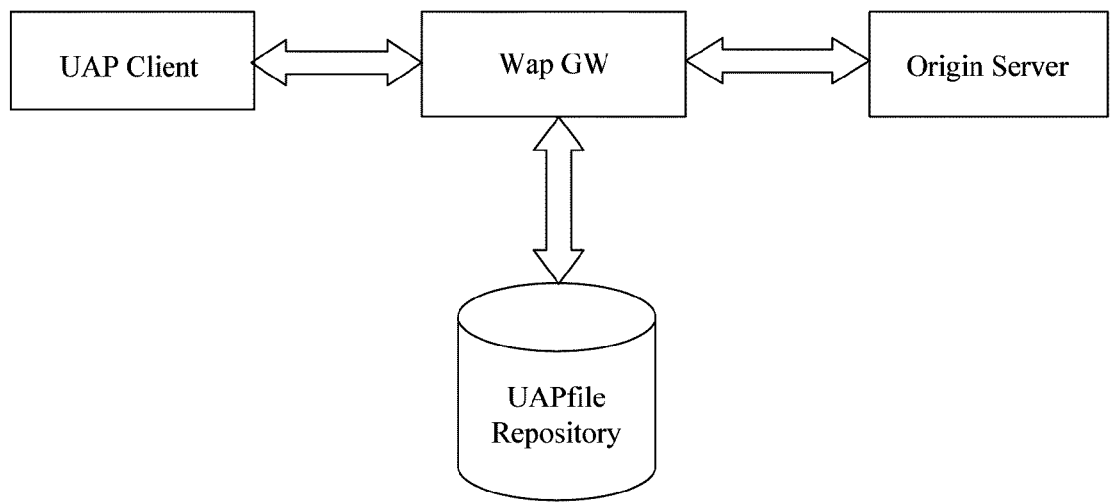
FIG. 1 is a structural block diagram of primary components of an existing UAP system.
Figure 2:
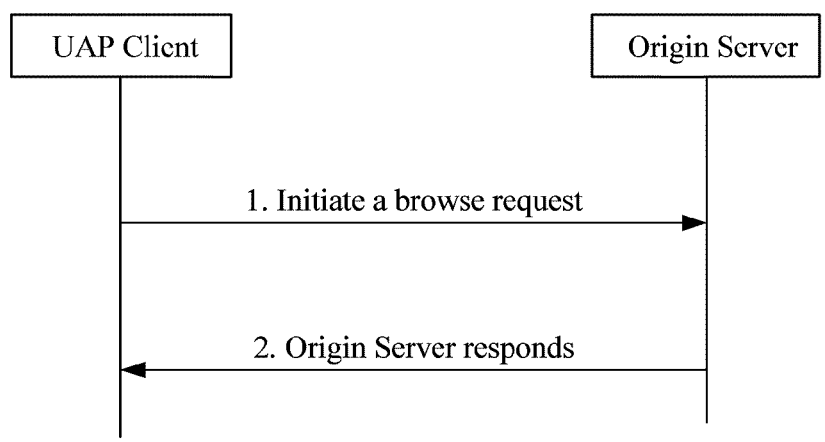
FIG. 2 is a schematic diagram of a process in which an existing UAP client initiates a request to an origin server.
Figure 3:
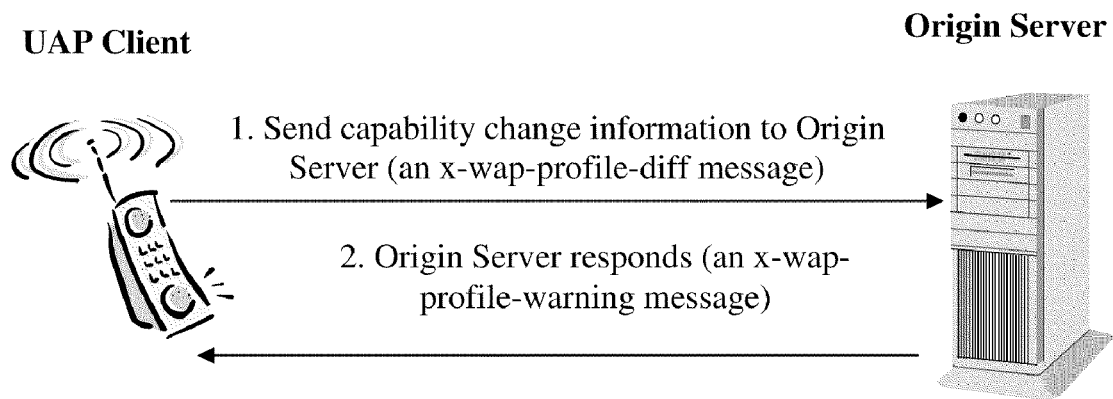
FIG. 3 is a schematic diagram of a process in which the existing UAP client, when its capability information is changed, reports on its own initiative the information on the capability change to the origin server.
Figure 4:
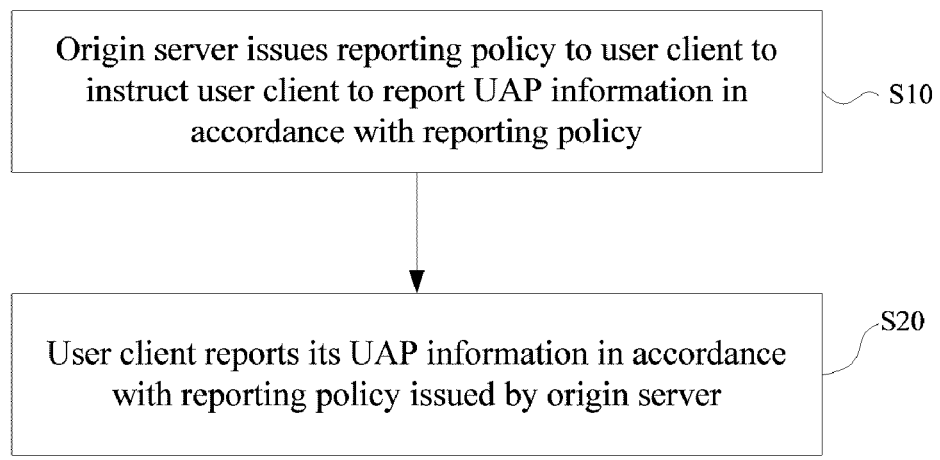
FIG. 4 is a flow chart of the implementation principle of a first reporting processing method for User Agent Profile information, according to an embodiment of the invention.

With reference to FIG. 4, a flow chart of the implementation principle of a first reporting processing method for User Agent Profile information according to the embodiment of the invention is shown, and the primary implementation procedure of the method is as follows.

Step S10: the origin server issues a reporting policy (policy information) to the user client (the UAP client) and instructs the UAP client to report UAP information in accordance with the reporting policy.

Particularly, the reporting policy issued from the origin server to the UAP client can be determined by the origin server itself or in the following procedure:

The UAP client reports reporting policies can be supported by it to the origin server. Particularly, the UAP client can report the reporting policies that it can support corresponding to a related UAP in accordance with an instruction from the origin server. For example, when the origin server instructs the UAP client to report reporting policies that can be supported corresponding to the CPU usage, the UAP client reports reporting policies that it can support corresponding to the CPU usage to the origin server in accordance with the instruction from the origin server; and the origin server selects at least one of the reporting policies reported by the UAP client as the reporting policy to be issued to the UAP client in accordance with a service demand of a user applied service.

Step S20: subsequently, the UAP client reports its UAP information in accordance with the reporting policy issued by the origin server, and a specific reporting procedure can be as follows.

The UAP client stores the reporting policy (the policy information) issued by the origin server.

Subsequently, the UAP client monitors in real time whether its related UAP information can satisfy the stored reporting policy.

If discovering that its related UAP information satisfies the stored reporting policy, the UAP client reports its related UAP information to the origin server.

Finally, the origin server tailors the user applied service in accordance with the UAP information reported by the UAP client, so that a service to be issued to the user can be tailored into a form more adapted to and supported by the user client and issued to the user client of the user.

Based upon the above implementation procedure, subsequently the origin server can further update the report policy (the policy information) issued to the UAP client as required (for example, in the case that the service demand of a service newly applied by the user is changed), and for this purpose, the origin server can select a new one of the supported reporting policies that are reported by the UAP client, issue the selected new reporting policy to the UAP client, and instruct the UAP client to give up using the old reporting policy and to report the UAP information in accordance the received new reporting policy.

Based upon the principle of the inventive method, in the case that the UAP client has stored the reporting policy (the policy information) issued by the origin server, if subsequently the UAP client discovers that its related UAP information is changed, the UAP client firstly determines whether any stored reporting policy (the policy information) matches; if a matching reporting policy exists, then the UAP client determines whether the changed UAP information satisfies the matching reporting policy; and if the changed UAP information satisfies the matching reporting policy, then the UAP client reports the changed UAP information to the origin server; otherwise the UAP client ignores the changed UAP information.

In the above processing, preferably the UAP client can have the reporting policies that it can support carried in an extended message header x-wap-profile-diff and reported to the origin server. The UAP client can extend the item "Format" in the existing message header x-wap-profile-diff by adding a field for carrying the reporting policies that the UAP client can support. For example, a specific format of the non-extended message header x-wap-profile-diff is as follows:

| | |
|---|---|
| Header Name: | x-wap-profile-diff |
| Description: | This header contains additional profile information which should be applied to the CPI prior to serving any content. |
| Format: | x-wap-profile-diff ="x-wap-profile-diff"":" profile-diff-seq ";" profile-desc |
| | profile-diff-seq =("1"|"2"|"3"|"4"|"5"|"6"|"7"|"8"|"9") *DIGIT |
| | profile-desc =<XML document containing profile subset of the UAProf schema> |
| | DIGIT =<any US-ASCII digit "0".."9"> |
| Default: | None |

By extending the existing message header x-wap-profile-diff, a specific format of the extended message header x-wap-profile-diff for carrying the reporting policies that the UAP client can support is as follows:

| | |
|---|---|
| Header Name: | x-wap-profile-diff |
| Description: | This header contains additional profile information which should be applied to the CPI prior to serving any content. |
| Format: | x-wap-profile-diff ="x-wap-profile-diff"":"profile-diff-seq ";"profile-desc |
| | profile-diff-seq =("1"|"2"|"3"|"4"|"5"|"6"|"7"|"8"|"9") *DIGIT |
| | profile-desc =<XML document containing profile subset of the UAProf schema> |
| | DIGIT =<any US-ASCII digit "0".."9"> |
| | policy-desc =<XML document containing policy of server> |
| Default: | None |

Correspondingly, the origin server can have the corresponding selected reporting policy carried in the extended message header x-wap-profile-warning and issued to the UAP client. Likewise, the origin server can extend the item "Format" in the existing message header x-wap-profile-warning by adding a field for carrying the reporting policy to be issued by the origin server. For example, a specific format of the non-extended message header x-wap-profile-warning is as follows:

| | |
|---|---|
| Header Name: | x-wap-profile-warning |
| Description: | This header is used by the origin server to indicate whether the CPI has been honoured when the response to the request was generated. |
| Format: | x-wap-profile-warning ="x-wap-profile-warning"":"warning-code |
| | warning-code = 200 | 201 | 202 | 203 | 500 |
| Default: | None |

By extending the existing message header x-wap-profile-warning, a specific format of the extended message header x-wap-profile-warning for carrying the reporting policy to be issued by the origin server to the UAP client is as follows:

| | |
|---|---|
| Header Name: | x-wap-profile-warning |
| Description: | This header is used by the origin server to indicate whether the CPI has been honoured when the response to the request was generated. |
| Format: | x-wap-profile-warning ="x-wap-profile-warning"":"warning-code ";" policy-desc |
| | warning-code = 200 | 201 | 202 | 203 | 500 |
| | policy-desc =<XML document containing policy of server> |
| Default: | None |

Preferably, both the reporting policies to be carried in the extend message header x-wap-profile-diff by the UAP client and the reporting policy to be carried in the extended message header x-wap-profile-warning by the origin server can be represented, respectively, based upon a Web Service Policy (WS-Policy) Framework. The WS-policy standard is intended to provide a mechanism necessary for enabling a Web service application program to establish policy information. Specifically, this standard defines the following contents:

a set of XML information, which is referred to as a policy expression and includes domain-specific Web service policy information; and a set of core structures, which indicate how to apply a selected and/or domain-specific policy assertion.

Typically, the WS-policy is design to be applicable to a conventional Web Service Framework, and a specific example of the Web Service Framework is as follows.

```
01 <wsp:Policy>
02 <wsp:ExactlyOne>
03 <wsse:SecurityToken>
04 <wsse:TokenType>wsse:Kerberosv5TGT</wsse:TokenType>
05 </wsse:SecurityToken>
06 <wsse:SecurityToken>
07 <wsse:TokenType>wsse:X509v3</wsse:TokenType>
08 </wsse:SecurityToken>
09 </wsp:ExactlyOne>
10 </wsp:Policy>
```

Particularly, the lines in the example of the Web Service Framework above mean respectively as follows.

Lines 02 and 09 indicate a policy operator of Exactly One, and the policy operator combines policy assertions into a policy alternative option;

Lines 03 and 08 indicate that a security token assertion designated by one of them is included in invoking a Web service;

Lines 03 to 05 and lines 06 to 08 indicate two specific security policy assertions, which indicate that two types of identity validation are supported.

Further in the above process, the reporting policies that can be supported by the UAP client can also be carried in a SOAP message and reported to the origin server by the UAP client, and correspondingly, the origin server can carry the selected corresponding reporting policy in a SOAP message and issue it to the UAP client. A specific implementation principle is the same as the principle of extending the message headers x-wap-profile-diff and x-wap-profile-warning to carry the reporting policy as described above, and descriptions thereof will be omitted hereinafter.

A specific implementation of the reporting processing method for UAP information according to the invention will be detailed below with reference to an embodiment thereof in which the user client reports its battery energy, for example, as the UAP information to the origin server.

It is assumed that the user client supports battery energy threshold based reporting, and supports the following three reporting policies.

1) Battery energy threshold based reporting; 2) Battery energy increment threshold based reporting; and 3) both reporting in 1) and 2).

Then the user client represents the three reporting policies that it can support based upon the following WS-policy:

```
01 <wsp:Policy>
02 <wsp:ExactlyOne>
03 <dpe:energy>
04 <dpe:thresholdtype> dpe:lowerthreshold </dpe: thresholdtype >
05 </dpe: energy >
06 <dpe: energy >
07 <dpe: thresholdtype> dpe: incrementthreshold </dpe: thresholdtype >
08 </dpe: energy >
09 <dpe: energy >
10 <dpe: thresholdtype> dpe: threshold </dpe: thresholdtype >
11 </dpe: energy >
12 </wsp:ExactlyOne>
13 </wsp:Policy>
```

In the above WS-Policy Framework, dpe:energy indicates a battery energy attribute of a dpe field; dpe:thresholdtype indicates a policy of reporting a battery energy; dpe:lowerthreshold indicates the battery energy threshold based reporting; dpe:incrementhreshold indicates the battery energy increment threshold based reporting; and dpe:threshold indicates that both of the above two reporting ways are supported.

The user client reports the reporting policies represented based upon the WS-policy to the origin server, particularly, through extending the existing message header x-wap-profile-diff, the user client can have the reporting policies represented based upon the WS-policy carried in the message header x-wap-profile-diff and sent to the origin server.

Upon receipt of the reporting polices reported by the user client, the origin server selects, in accordance with a demand of the user applied service, a reporting policy that the user client notifies the origin server of battery energy information when the battery energy is reduced to 200 MAH, and issues the selected battery energy reporting policy to the user client, where the origin server also represents information on the selected battery energy reporting policy correspondingly based the following WS-policy:

```
01 <wsp:Policy>
02 <wsp:ExactlyOne>
03 <dpe:energy>
04 <dpe:thresholdtype> dpe:lowerthreshold </dpe: thresholdtype >
05 <dpe:thresholdvalue> 200 </dpe: thresholdvalue >
06 </dpe: energy >
07 </wsp:ExactlyOne>
08 </wsp:Policy>
```

Correspondingly, through extending the existing message header x-wap-profile-warning, the origin server can also have the battery energy reporting policy represented based upon the WS-policy carried in the message header x-wap-profile-warning and issued to the user client.

Upon receipt of the battery energy reporting policy issued by the origin server, the user client can store the battery energy reporting policy. The user client monitors the stored battery energy reporting policy; and if the user client discovers that its battery energy is reduced to 200 MAH during subsequent processing of various services, it reports to the origin server of a current value of its battery energy as the UAP information, so that the origin server can carry out appropriate processing.

Hereinafter, descriptions of how the user client reports corresponding UAP information of battery energy to the origin server in accordance with the battery energy reporting policy issued by the origin server will be presented by way of an example in which the user client is in progress of an online game, and specific interaction steps are as follows:

1) A user starts an online game with the use of a mobile client, and the mobile client reports battery energy reporting policies it can support to the origin server while reporting its UAP related information to the origin server.

2) Upon receipt of the battery energy reporting polices supported by the mobile client, the origin server selects a reporting policy that the mobile client notifies the origin server about information on battery energy of the mobile client when the battery energy is reduced to 200 MAH in accordance with a demand of the user applied service, and issues the selected battery energy reporting policy to the mobile client.

3) Upon receipt of the battery energy reporting policy issued by the origin server, the mobile client stores information related to the reporting policy, and monitors its battery energy attribute in accordance with the reporting policy information.

4) The mobile client reports a current value of its battery energy as the corresponding UAP information to the corresponding server when it discovers that its battery energy has been reduced to 200 MAH; according to this battery energy value reported by the mobile client, the origin server can know that the mobile client currently has no sufficient energy and thus may be powered off at any time, and therefore backups in real time the data related to the online game of the user in time in order to prevent any loss of user service data.

Hereinafter, a specific implementation of the reporting processing method for UAP information according to the invention will be detailed with reference to another embodiment thereof.

1. It is assumed that the UAP client has subscribed for a multimedia video service entitled "NBA LIVE" at the origin server.

2. The UAP client reports to the origin server the UAP information on its software, hardware, a service content translation capability, etc., corresponding to the multimedia video service.

3. The origin server recognizes that a buffer space currently available in the UAP client is 200K and provides the UAP client with a video and audio service stream of a high quality.

4. Also, the origin server issues a reporting policy related to the buffer space to the UAP client, requiring the UAP client to notify the origin server when discovering that its buffer space is reduced below 150K.

5. The UAP client monitors a size of its available buffer space while playing a video and audio service program provided by the origin server.

6. The UAP client initiates another server while playing the video and audio service program provided by the origin server, and triggers the reporting policy issued by the origin server when it discovers that the size of its available buffer space has been reduced below 150K.

7. The UAP client reports the size of its currently available buffer space to the origin server and requests the origin server to modify the way of issuing the service.

8. The origin server provides the UAP client with the video and audio service stream of a slightly lowered quality in accordance with the size of the currently available buffer space reported by the UAP client.

9. The UAP client proceeds with playing the video and audio service program provided by the origin server.

10. Subsequently the UAP client closes the additional service initiated in the step 6, and therefore the size of the buffer space currently available in the UAP client is above 150K again because some available buffer space of the UAP client has been released due to closing of this service, and then the UAP client triggers again the reporting policy issued by the origin server.

11. The UAP client reports again the size of its currently available buffer space to the origin server and requests the origin server to modify the way of issuing the service.

12. The origin server provides again the UAP client with the video and audio service stream of a high quality in accordance with the size of the currently available buffer space reported by the UAP client.

In the above procedure, the origin server can also update the buffer space related reporting policy issued to the UAP client, requiring, for example, that the UAP client shall notify the origin server when it discovers that its buffer space is increased or reduced to up to 50K; and thus the UAP client notifies the origin server if it discovers that the size of its currently available buffer space reaches 50K while playing the program, and the origin server performs a corresponding process on the video and audio service stream to be issued in accordance with the size of the buffer space currently available in the UAP client, so that the video and audio service stream is better adapted to the size of the buffer space currently available in the UAP client.

It can be seen that the reporting processing method for UAP information according to the invention can enable the user client to report appropriate UAP information based upon a reporting policy issued by the origin server, so that the user client can report the UAP information based upon a threshold, report the UAP information periodically, etc., and therefore the user client in a UAP system can report the UAP information in more flexible and diverse ways.

Figure 5:
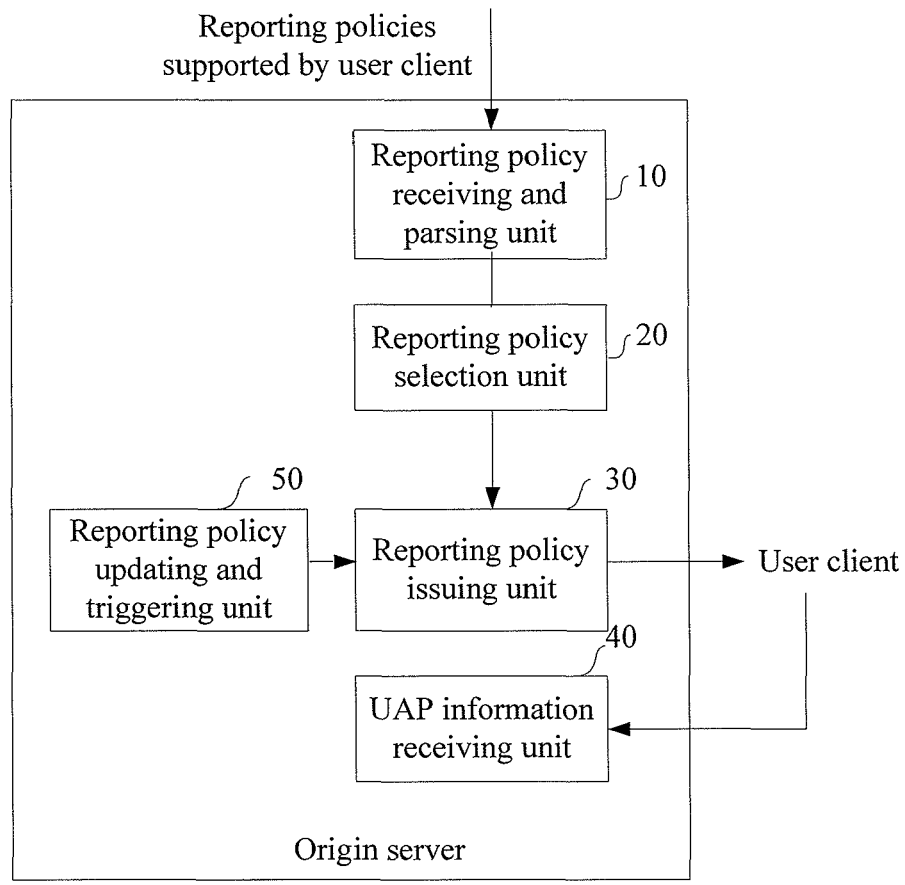
FIG. 5 is a structural block diagram of components of a first server, according to an embodiment of the invention.

In correspondence with the first reporting processing method for User Agent Profile information according to the invention, the invention also provides correspondingly an origin server and a User Agent Profile user client. With reference to FIG. 5, a structural block diagram of components of a first origin server according to an embodiment of the invention is shown, which includes a reporting policy receiving and parsing unit 10, a reporting policy selection unit 20, a report policy issuing unit 30, a UAP information receiving unit 40, and a reporting policy updating and triggering unit 50, where functions of the respective constituent units are as follows:

The reporting policy receiving and parsing unit 10 is adapted to receive reporting polices, which a user client can support with respect to a corresponding UAP, reported by the user client;

The reporting policy selection unit 20 is adapted to select at least one reporting policy among the reporting policies received by the reporting policy receiving and parsing unit 10; particularly, the reporting policy selection unit 20 can select at least one reporting policy among the reporting policies received by the reporting policy receiving and parsing unit 10 in accordance with, but not limited to, a service demand of a user applied service;

The reporting policy issuing unit 30 is adapted to issue the reporting policy selected by the reporting policy selection unit 20 to the user client to instruct the user client to report the UAP information in accordance with the reporting policy;

The UAP information receiving unit 40 is adapted to receive the UAP information satisfying the reporting policy, which is reported by the user client every time upon discovery that the UAP information satisfies the reporting policy.

Further, the reporting policy issuing unit 30 can also determine directly the reporting policy to be issued to the user client, and issue the determined reporting policy to the user client to instruct the user client to report UAP information in accordance with the reporting policy;

The reporting policy updating and triggering unit 50 is adapted to trigger the reporting policy issuing unit 30 to issue a new reporting policy to instruct the user client to give up the old reporting policy and report UAP information in accordance with the new reporting policy.

The reporting policy issuing unit 30 can have the determined or selected reporting policy carried in the extended message header x-wap-profile-warning and issued to the user client, and represent the reporting policy carried in the extended message header x-wap-profile-warning based upon the Web Service Policy Framework.

Further, the reporting policy issuing unit 30 can also have the determined or selected reporting policy carried in a SOAP message and issued to the user client.

The specific descriptions of the implementation details of the relevant technologies in the first reporting processing method for UAP information according to the invention can be referred to for specific implementation details of other relevant technologies in the first server according to the invention, and description thereof will be omitted hereinafter.

Figure 6:
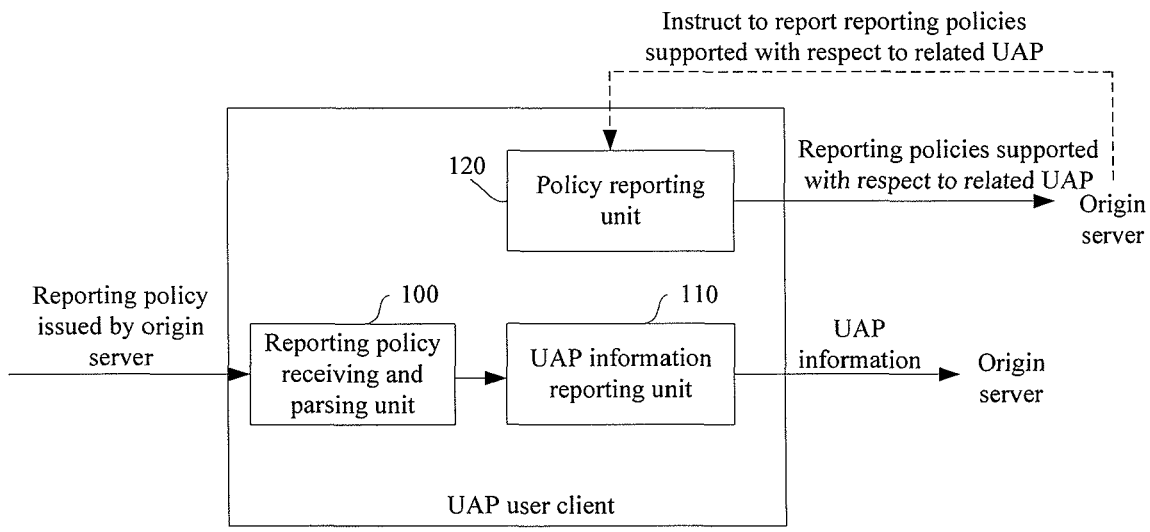
FIG. 6 is a structural block diagram of components of a first User Agent Profile user client, according to an embodiment of the invention.

With reference to FIG. 6, a structural block diagram of components of the first User Agent Profile user client according to the embodiment of the invention is shown, which includes a reporting policy receiving and parsing unit 100, a User Agent Profile information reporting unit 110 and a policy reporting unit 120, where functions of these constituent units are as follows.

The reporting policy receiving and parsing unit 100 is adapted to receive and parse information on a reporting policy (policy information) issued by the origin server;

The User Agent Profile information reporting unit 110 is adapted to report UAP information of the user client in accordance with the reporting policy received by the reporting policy receiving and parsing unit 100;

The policy reporting unit 120 is adapted to report reporting policies that the user client can support to the origin server, where the policy report unit 120 can report the reporting policies that the user client can support with respect to the UAP in accordance with specific instruction information from the origin server.

Figure 7:
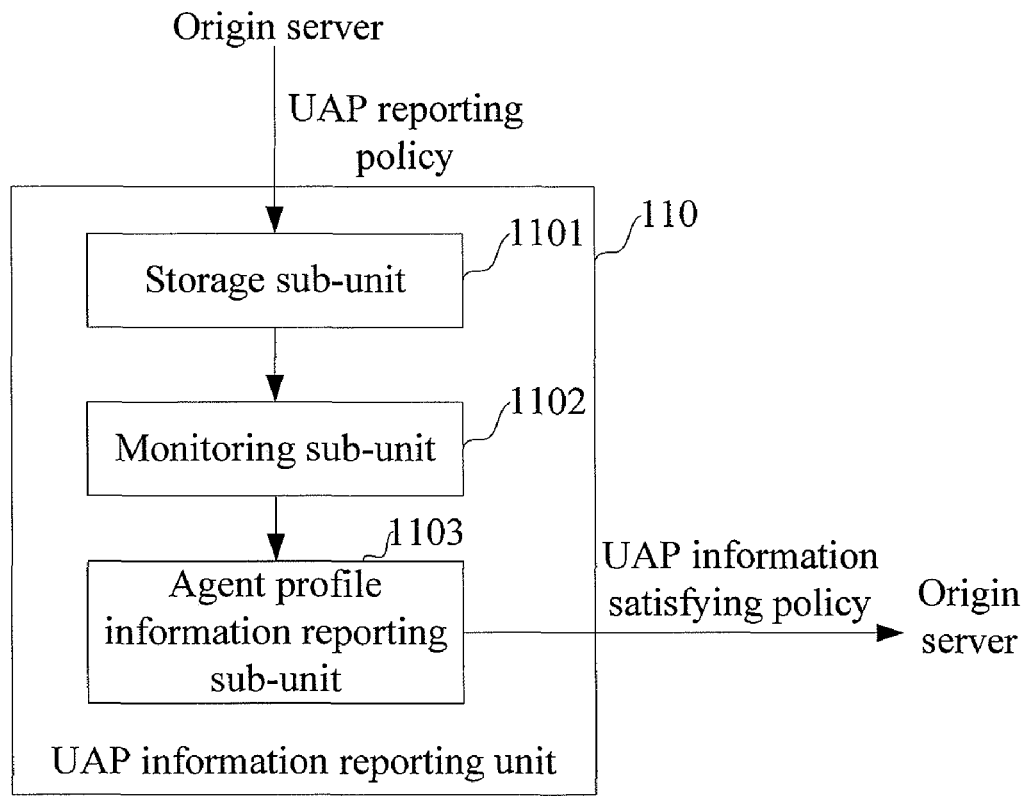
FIG. 7 is a structural block diagram of specific components of a User Agent Profile information reporting unit in the UAP user client, according to an embodiment of the invention.

With reference to FIG. 7, a structural block diagram of specific components of the User Agent Profile information reporting unit in the embodiment of the UAP user client according to the invention, and the User Agent Profile information reporting unit 110 particularly includes a storage sub-unit 1101, a monitoring sub-unit 1102, and an agent profile information reporting sub-unit 1103, where functions of the respective constituent units are as follows.

The storage sub-unit 1101 is adapted to store the reporting policy (policy information) received by the reporting policy receiving and parsing unit 100;

The monitoring sub-unit 1102 is adapted to monitor whether the related UAP information of the user client satisfies the reporting policy stored in the storage sub-unit 1101;

The agent profile information reporting sub-unit 1103 is adapted to report the related UAP information of the user client that is satisfying the stored reporting policy to the origin server when the monitoring sub-unit 1102 discovers that the UAP information satisfies the stored reporting policy.

The policy reporting unit 120 can have the reporting policies that the user client can support carried in the extended message header x-wap-profile-diff to be reported to the origin server, and represent the reporting policies carried in the extended message header x-wap-profile-diff based upon the Web Service Policy Framework.

Further, the policy reporting unit 120 can also have the reporting policies that the user client can support carried in a SOAP message to be reported to the origin server.

The specific descriptions of the implementation details of the relevant technologies in the first reporting processing method for UAP information according to the invention can be referred to for implementation details of other relevant technologies in the first user client according to the invention, and description thereof will be omitted hereinafter.

Figure 8:
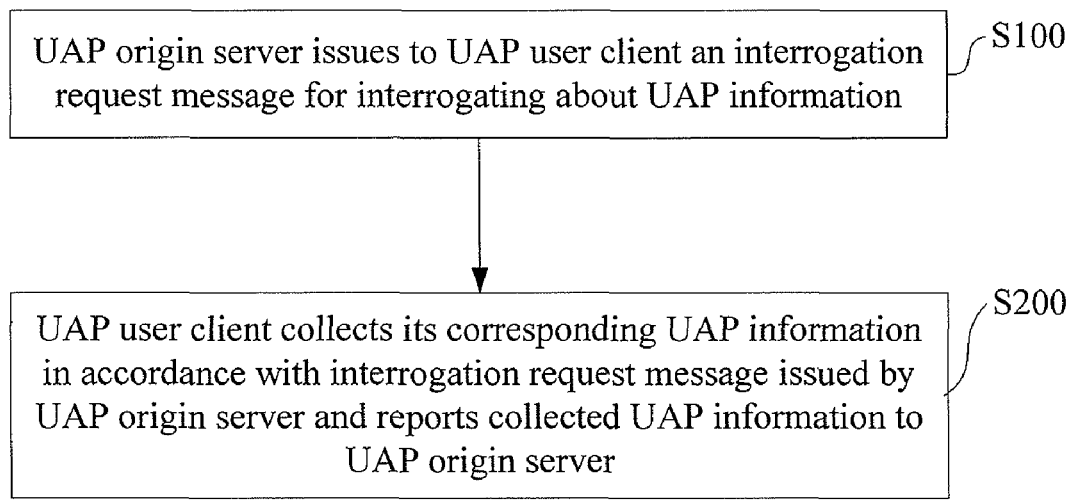
FIG. 8 is a flow chart of the implementation principle of a second reporting processing for User Agent Profile information, according to an embodiment of the invention.

With reference to FIG. 8, a flow chart of the implementation principle of the second reporting processing method for User Agent Profile information according to the embodiment of the invention is shown, and the implementation principle is as follows.

Step S100: the origin server issues to the UAP client an interrogation request message for interrogating about UAP information.

Particularly, a corresponding interrogation policy (for example, a periodical interrogation, an interrogation upon a service demand, etc.) can be preset and stored in the origin server; and the origin server issues to the UAP client the interrogation request message for interrogating about the UAP information when it discovers that its stored interrogation policy is satisfied.

The procedure in which the origin server issues an interrogation request message to the UAP client is as follows.

Firstly, the origin server sends the corresponding interrogation request message to a PUSH gateway, and then the PUSH gateway forwards the interrogation request message to the UAP client.

Step S200: the UAP client collects its corresponding UAP information in accordance with the interrogation request message issued by the origin server and reports the collected UAP information to the origin server.

As can be seen, the reporting processing method for UAP information according to the invention can enable the function of that the origin server interrogates on its own initiative the related UAP information of the UAP user client, thereby achieving the purpose of enabling the user client in the UAP system to report the UAP information in more flexible and diverse ways.

Figure 9:
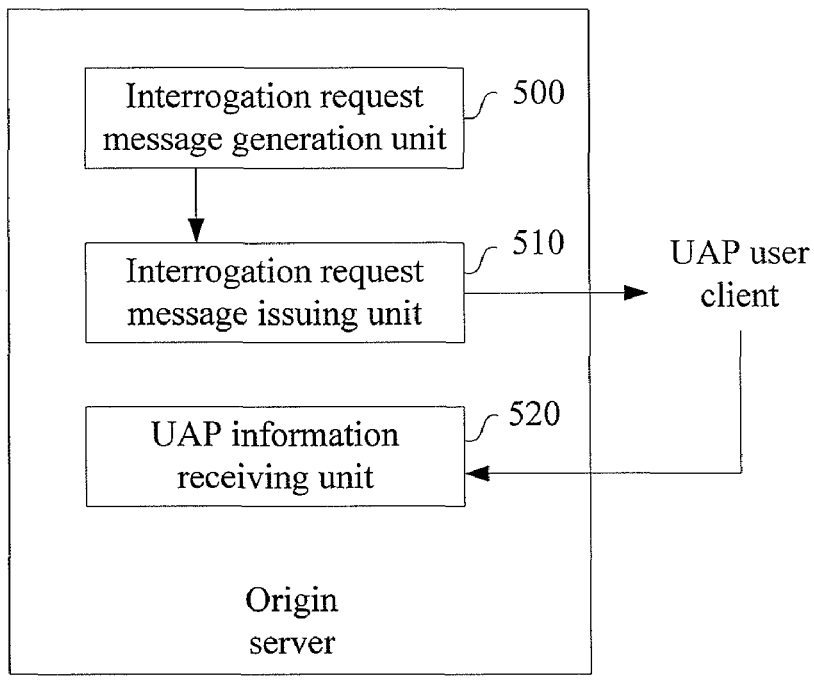
FIG. 9 is a structural block diagram of components of a second server, according to an embodiment of the invention.

In correspondence with the second reporting processing method for User Agent Profile information according to the invention, the invention further provides a server and User Agent Profile user client. With reference to FIG. 9, a structural block diagram of components of a second server according to the invention is shown, which includes an interrogation request message generation unit 500, an interrogation request message issuing unit 510, and a UAP information receiving unit 520, where functions of the respective constituent units are as follows.

The interrogation request message generation unit 500 is adapted to generate the interrogation request message for interrogating about the corresponding UAP information in the UAP user client;

The interrogation request message issuing unit 510 is adapted to issue the interrogation request message generated by the interrogation request message generation unit 500 to the corresponding UAP user client;

The UAP information receiving unit 520 is adapted to receive the UAP information which is interrogated about and reported by the user client in accordance with the interrogation request message.

Figure 10:
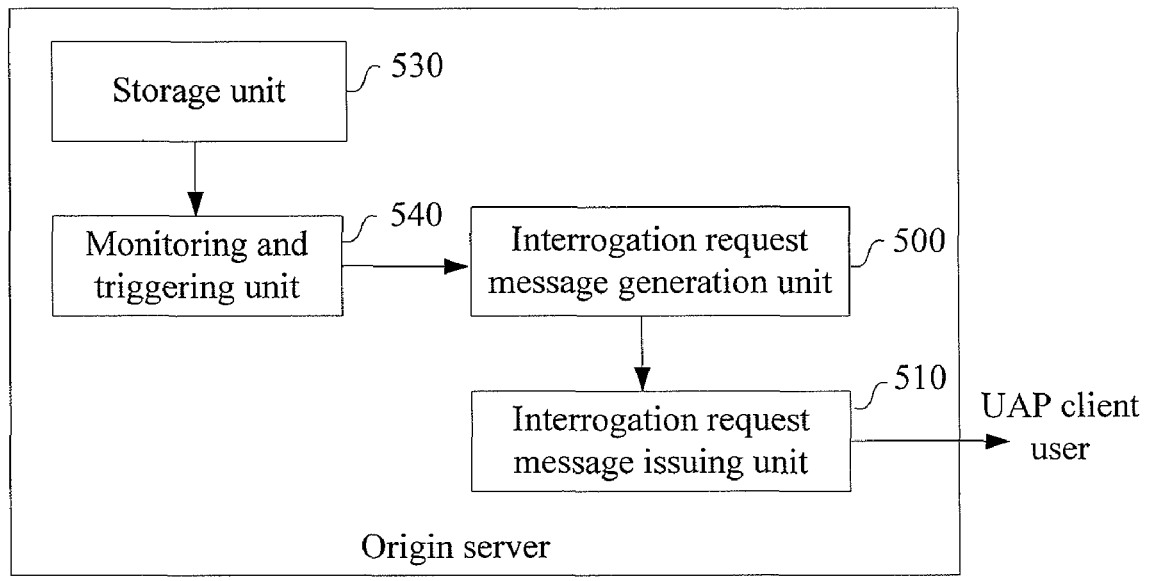
FIG. 10 is a structural block diagram of components of an origin server provided additionally with an interrogation policy, according to an embodiment of the invention.

With reference to FIG. 10, a structural block diagram of components of an origin server provided additionally with an interrogation policy according to an embodiment of the invention is shown, which further includes a storage unit 530 and a monitoring triggering unit 540 in addition to the structural components in FIG. 9, and functions of these two additional constituent units are as follows:

The storage unit 530 is adapted to store a preset interrogation policy (for example, a periodical interrogation, an interrogation upon a service demand, etc.);

The monitoring and triggering unit 540 is adapted to monitor whether the interrogation policy stored in the storage unit 520 is satisfied, and trigger the interrogation request message generation unit 500 to generate the corresponding interrogation request message when it discovers that the corresponding interrogation policy is satisfied.

Figure 11:
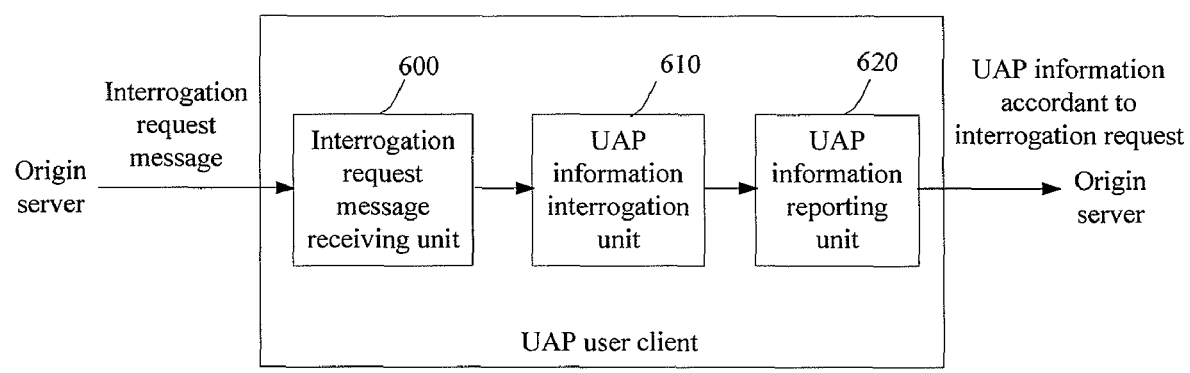
FIG. 11 is a structural block diagram of components of a second UAP user client, according to an embodiment of the invention.

With reference to FIG. 11, a structural block diagram of components of the second UAP user client according to the embodiment of the invention is shown, which includes an interrogation request message receiving unit 600, a User Agent Profile information interrogation unit 610 and a User Agent Profile information reporting unit 620, where functions of the respective constituent units are as follows.

The interrogation request message receiving unit 600 is adapted to receive an interrogation request message for interrogating about corresponding UAP information, which is issued by an origin server;

The User Agent Profile information interrogation unit 610 is adapted to interrogate about the corresponding UAP information in the user client in accordance with the interrogation request message received by the interrogation request message receiving unit 600, which is issued by the origin server;

The User Agent Profile information reporting unit 620 is adapted to report the UAP information obtained by the User Agent Profile information interrogation unit 610 through interrogation to the origin server.

It is apparent that various modifications and variations can be made to the embodiments of the invention by those skilled in the art without departing from the spirit and scope of the embodiments of the invention. Accordingly, the invention is intended to cover all these modifications and variations provided that these modifications and variations fall within the scope of the claims appended to the invention and equivalents thereof.

What is claimed is:

1. A reporting processing method for User Agent Profile (UAP) information, comprising:
   issuing, by an origin server, a reporting policy to a user client to instruct the user client to report User Agent Profile information in accordance with the reporting policy;
   discovering, by the user client, that the user client's related UAP information is changed, wherein the UAP information is the capability information of the user client;
   determining, by the user client, whether the changed UAP information satisfies the reporting policy; and
   reporting, by the user client, the changed UAP information to the origin server if the changed UAP information satisfies the matching reporting policy.

2. The method according to claim 1, further comprising receiving reporting policies that are supported and reported by the user client;
   wherein the reporting policy issued is at least one selected from the reporting policies reported by the user client.

3. The method according to claim 2, further comprising:
   instructing, by the origin server, the user client to report the reporting policies that the user client supports.

4. The method according to claim 2, wherein the reporting policy is selected from the reporting policies in accordance with a service demand of a user applied service.

5. A User Agent Profile (UAP) user client, comprising:
   a reporting policy receiving and parsing unit adapted to receive and parse a reporting policy issued by an origin server, wherein the reporting policy is used to instruct the user client to report UAP information in accordance with the reporting policy;
   a UAP information reporting unit adapted to report UAP information satisfying the reporting policy received by the reporting policy receiving and parsing unit upon discovery that the UAP information satisfies the reporting policy; wherein, the UAP information reporting unit further comprises:
      a storage sub-unit, adapted to store the reporting policy received by the reporting policy receiving and parsing unit;
      a monitoring sub-unit, adapted to monitor whether the changed UAP information of the user client satisfies the reporting policy stored in the storage sub-unit when the monitoring sub-unit discovers the user client UAP information is changed; and
      an agent profile information reporting sub-unit, adapted to report the changed UAP information satisfying the stored reporting policy when the monitoring sub-unit discovers that the changed UAP information satisfies the reporting policy.

6. The user client according to claim 5, further comprising a policy reporting unit adapted to report reporting policies that the user client supports to the origin server.

7. The user client according to claim 6, wherein the reporting policies that the user client supports are carried in the extended message header x-wap-profile-diff or in a SOAP message.

8. A reporting processing method for User Agent Profile (UAP) information, comprising:
   storing, by an origin server, an interrogation policy in the origin server in advance;
   monitoring, by the origin server, whether the interrogation policy stored in the origin server is satisfied, and triggering to generate a corresponding interrogation request message when the origin server discovers that the interrogation policy is satisfied;
   generating, by the origin server, an interrogation request message for interrogating about UAP information in a user client;
   issuing, by the origin server to a user client, an interrogation request message for interrogating about UAP information; and
   receiving the UAP information interrogated about and reported by the user client in accordance with the interrogation request message.

9. The method according to claim 8, wherein the issuing by the origin server the interrogation request message to the user client comprises:
   issuing, by the origin server, the interrogation request message to a PUSH gateway; and
   forwarding, by the PUSH gateway, the interrogation request message to the user client.

10. The method according to claim 8, wherein the issuing by the origin server the interrogation request message to the user client comprises:
   issuing, by the origin server, the interrogation request message to a PUSH gateway; and
   forwarding, by the PUSH gateway, the interrogation request message to the user client.

11. An origin server, comprising:
an interrogation request message generation unit, adapted to generate an interrogation request message for interrogating about User Agent Profile information in a user client;
an interrogation request message issuing unit, adapted to issue the interrogation request message generated by the interrogation request message generation unit to the user client; and
a User Agent Profile information receiving unit, adapted to receive the User Agent Profile information interrogated about and reported by the user client in accordance with the interrogation request message; wherein, the origin server further comprises:
a storage unit, adapted to store a preset interrogation policy; and
a monitoring and triggering unit, adapted to monitor whether the interrogation policy stored in the storage unit is satisfied, and trigger the interrogation request message generation unit to generate a corresponding interrogation request message when the original server discovers that the interrogation policy is satisfied.

12. A reporting processing method for User Agent Profile (UAP) information, comprising:
receiving, by a user client, a reporting policy which is used to instruct the user client to report UAP information in accordance with the reporting policy from an origin server;
discovering, by the user client, that the user client's related UAP information is changed, wherein the UAP information is the capability information of the user client;
determining, by the user client, whether the changed UAP information satisfies the matching reporting policy; and
reporting, by the user client, the changed UAP information to the origin server if the changed UAP information satisfies the matching reporting policy;
wherein, the method further comprises:
storing, by the user client, the reporting policy issued by the origin server;
monitoring, by the user client, whether the UAP information satisfies the reporting policy comprises: monitoring, by the user client, whether the UAP information of the user client satisfies the stored reporting policy.

13. A reporting processing system for User Agent Profile (UAP) information, characterized by comprising:
an origin server, adapted to issue a reporting policy to a user client to instruct the user client to report UAP information in accordance with the reporting policy, and receive UAP information reported by the user client;
the user client, adapted to discover that the user client's related UAP information is changed, wherein, the UAP information is the capability information of the user client, determining whether the changed UAP information satisfies the matching reporting policy, and report the changed UAP information to the origin server if the changed UAP information satisfies the matching reporting policy;
wherein the user client is further adapted to store the reporting policy, monitor whether the UAP information of the user client satisfies the reporting policy, and report the UAP information satisfying the stored reporting policy when a monitoring sub-unit discovers that the UAP information satisfies the reporting policy.

14. The reporting processing system according to claim 13, wherein the origin server is further adapted to instruct the user client to report the reporting policies that the user client supports.

\* \* \* \* \*